Dec. 3, 1957  W. STERN  2,814,812
METHOD OF FORGING NUT BLANKS HAVING AXIALLY
EXTENDING SKIRT PORTIONS AND ATTACHING
A WASHER THERETO
Filed Jan. 19, 1954  2 Sheets-Sheet 1
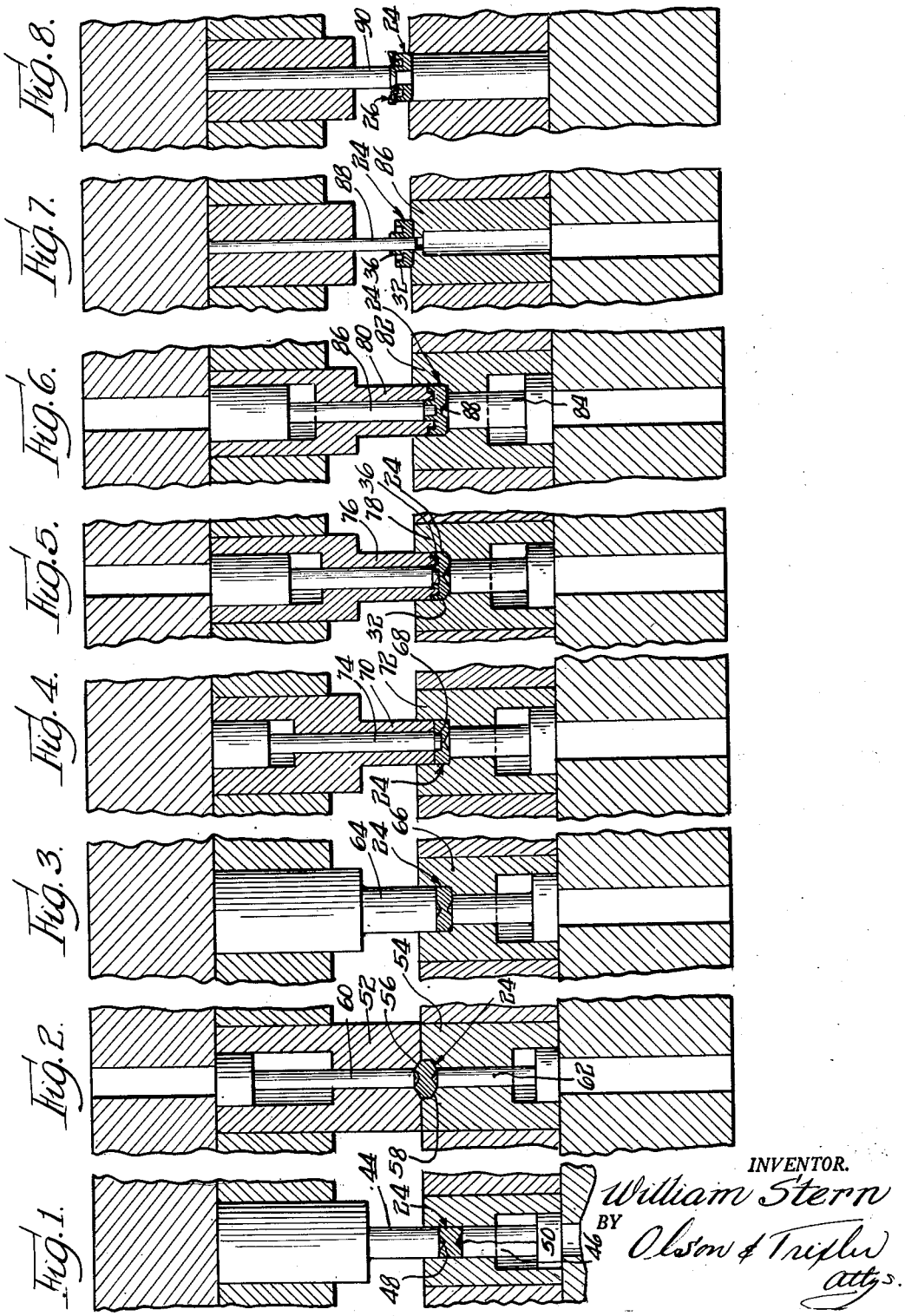
INVENTOR.
William Stern
BY
Olson & Trexler
attys.

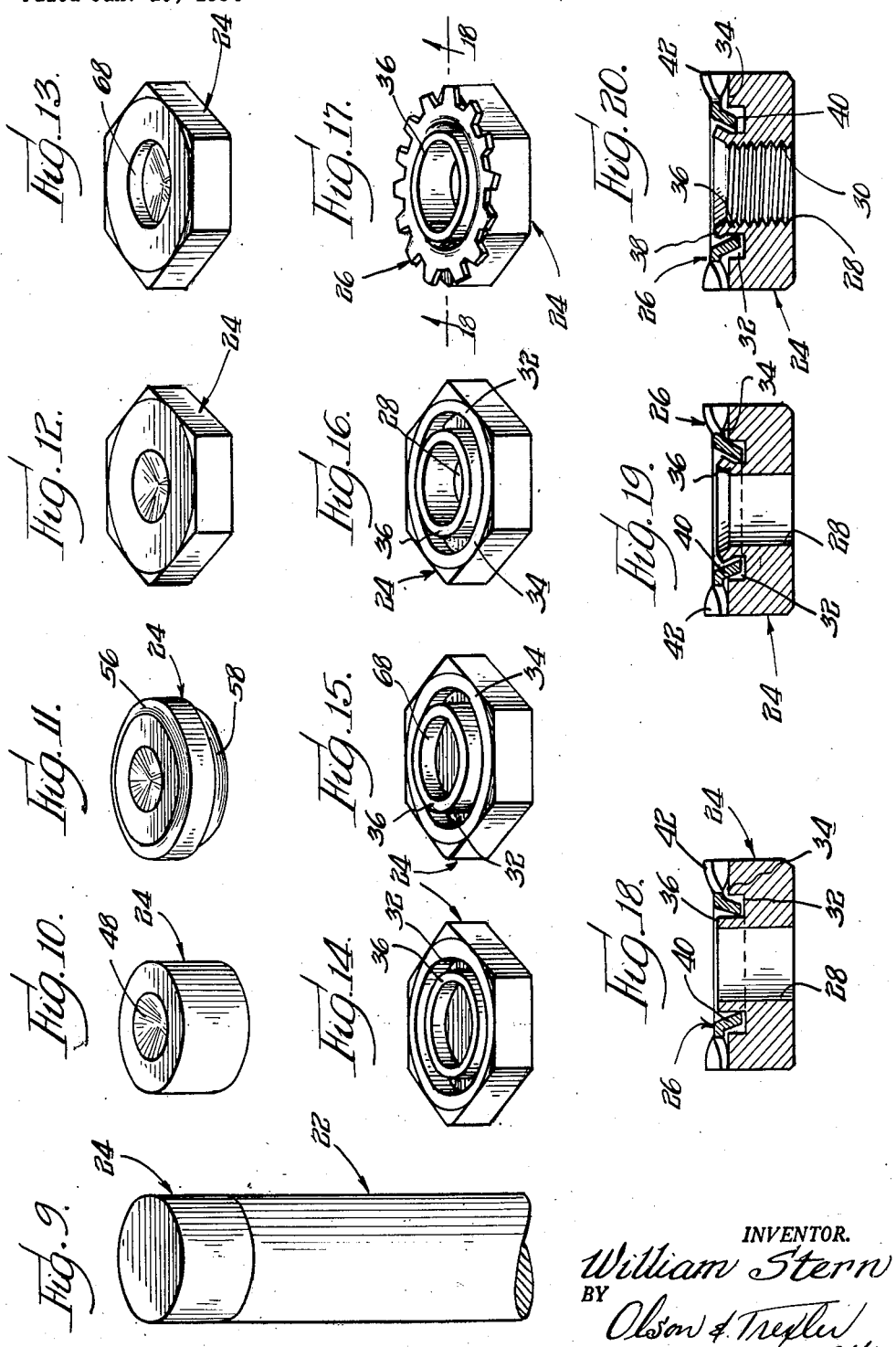

United States Patent Office 2,814,812
Patented Dec. 3, 1957

2,814,812
METHOD OF FORGING NUT BLANKS HAVING AXIALLY EXTENDING SKIRT PORTIONS AND ATTACHING A WASHER THERETO

William Stern, Park Ridge, Ill., assignor to Illinois Tool Works, Chicago, Ill., a corporation of Illinois Application January 19, 1954, Serial No. 404,961

6 Claims. (Cl. 10—86)

The present invention relates to a novel method of manufacturing fastener units and, more particularly, a novel method of manufacturing pre-assembled nut and washer assemblies.

Fastener units of the type contemplated by the present invention include a nut having an annular skirt projecting axially from the clamping face thereof. A washer is assembled over the skirt, after which the skirt is flared outwardly to retain the nut and washer in pre-assembled relationship. It is an object of the present invention to provide a novel method of making such fastener units rapidly and economically.

A more specific object of the present invention is to provide a novel method of making a nut of the type described above by relatively simple punching and swaging operations.

A further object of the present invention is to provide a novel method of making a nut of the above described type in the manner so that blanks containing substantially a minimum amount of material may be utilized to effect economical production.

Still a further object of the present invention is to provide a novel method for making a nut of the above described type so that the holding power of the nut remains substantially undiminished.

Other objects and advantages of the present invention will become apparent from the following description and the accompanying drawings, wherein:

Figs. 1 through 8 are somewhat diagrammatic cross-sectional views illustrating successive steps of the novel method of this invention;

Fig. 9 is a perspective view of the stock material used in the method of this invention;

Figs. 10 through 16 are perspective views illustrating a nut blank in successive stages of production by the method of this invention;

Fig. 17 is a perspective view illustrating a lock washer applied to the nut blank;

Fig. 18 is a cross-sectional view taken along line 18—18 in Fig. 17;

Fig. 19 is a cross-sectional view similar to Fig. 18 and further shows how the nut blank is formed to retain the washer; and Fig. 20 is a cross-sectional view similar to Fig. 19 and showing the fastener unit after threads have been formed on the nut.

In accordance with the present invention, nuts for pre-assembled fastener assemblies may be rapidly and economically manufactured from a wire or rod 22 of suitable material, such as steel, and having a circular cross section, as shown in Fig. 9. A nut blank or slug 24 containing the required volume of material is sheared from the rod in any suitable manner, not shown, and then subjected to a series of swaging and punching operations. As will become apparent from the following description, each of the individual nut forming operations is relatively simple and may be performed by providing standard punch presses or similar machines with suitable punching or forming dies. It is contemplated that several or all of the nut forming steps may be performed by single machine or alternatively a plurality of machines may be provided for performing certain of the forming steps.

In Fig. 20, a completed pre-assembled fastener unit is illustrated. This unit includes the nut or nut blank 24 which has been processed in accordance with the present invention and a lock washer 26. The nut has a central aperture 28 provided with helical threads 30 and an annular groove 32 formed in a radially extending clamping face 34. Between the annular groove and the aperture is an annular skirt 36 which projects axially so that the free terminal end 38 thereof is located axially outwardly from the clamping face. The lock washer 26 includes a frusto conical body portion 40 which is assembled over the skirt and projects into the groove 32. The washer is provided with any suitable locking means such as twisted teeth 42. After the washer has been applied over the skirt, the outer end portion of the skirt is flared in the manner illustrated to retain the washer in assembled relationship. It should be noted that since the skirt projects a substantial predetermined distance axially from the clamping face 34, the groove 32 may be relatively shallow and the threads 30 may extend for substantially the full thickness of the nut whereby the strength and holding power of the nut is undiminished.

The novel method of the present invention may best be described by referring to the drawings. After the nut blank 24 has been sheared from the wire or rod 22, it is subjected to the first forming step illustrated in Figs. 1 and 10. In this step, the blank is acted upon by a pair of cooperating dies 44 and 46 which serve to square the ends of the blank and form centering dimples 48 and 50 therein. These dimples serve to facilitate proper positioning of the blank for subsequent forming steps.

The blank 24 initially has a diameter less than the diameter of the finished nut and a thickness greater than the thickness of the finished nut. Therefore, in accordance with the present invention, the blank is stamped or swaged to form it to the desired thickness and diameter and also to provide it with the desired peripheral configuration. While the drawings illustrate forming the blank in a hexagonal nut, it is obvious that the present invention contemplates the production of nuts having other non-circular shapes. In order to flatten the blank and eliminate any possibility of injury thereto resulting from the cold working of the material, the blank is subjected to the action of cooperating dies 52 and 54 which compress the blank and bevel or taper the end portions thereof, as indicated at 56 and 58. Centering pins 60 and 62 may be provided for positioning the blank properly for action by the dies 52 and 54. The blank is then flattened to substantially its final thickness and formed with the desired peripheral configuration, as shown in Fig. 12. The manner in which this step of the process may be accomplished is illustrated in Fig. 3 wherein the blank is shown compressed between cooperating dies 64 and 66.

In accordance with one embodiment of the present invention, the flattened blank is formed in the manner shown in Figs. 4 and 13 to partially punch a central aperture 68 therein. Thus, the blank is held between upper and lower dies 70 and 72 and acted upon by a punch 74. However, in many instances, this step is unnecessary and may be omitted, if desired. The blank, as shown in either Figs. 12 or 13, is embossed to provide the annular groove 32 therein, as shown in Figs. 5 and 14. This is accomplished by means of a pair of co-operating dies 76 and 78. This step also initiates the formation of the annular skirt 36. It is seen that at this stage of the process, the terminal end of the annular skirt is co-extensive with or in the same plane as the clamping face 34 and that the groove is relatively deep. The blank is then formed or extruded in the manner shown in Figs. 6 and 15 so that the skirt is moved axially to position the terminal edge thereof outwardly from the nut clamping face. This is accomplished by the cooperating dies 80, 82 and 84, shown in Fig. 6. At the same time, a punch 86 enters a partially formed aperture in the blank so that the material extruded from the center of the blank by the projection 88 of the die 84 flows into the surrounding portions of the blank to raise the bottom of the groove and to provide material for extending the skirt. Furthermore, the projection 88 partially forms the central aperture in the blank. It has heretofore been proposed to form a somewhat similar nut having a groove in the clamping face thereof and an annular skirt for retaining a washer. Such nuts have been formed by cutting away the material of the blank which is a relatively slow process. For example, when using the prior method just referred to, nuts may be formed at the rate of about 50 per minute, while it is contemplated that the present invention will enable the production of nuts at about 150 per minute. Furthermore, when the material of the nut is cut away to provide the groove, insufficient material remains to permit extrusion of the nut so as to position the terminal end of the skirt a substantial distance axially from the clamping face.

After the nut blank has been formed in the manner shown in Figs. 6 and 15, the relatively thin web closing the central aperture is easily punched out, as shown in Figs. 7 and 16, to provide the unobstructed aperture 28. Thus, as shown in Fig. 7, the blank 24 is placed on a die 86 and the central web is struck therefrom by a punch 88. The washer 26 is then applied thereto, as shown in Figs. 17 and 18, and the end of the skirt is swaged outwardly by a punch 90, as shown in Figs. 8 and 19. The final step in the process is that of tapping the aperture 28 of the nut to provide threads and this may be accomplished in any suitable manner, not shown.

From the above description, it is seen that the present invention has provided a method for producing a pre-assembled nut and washer assembly in a rapid and economical manner. More specifically, it is seen that the present invention has provided a novel method for making a nut from economical circular stock material by simple punching or swaging operations and for providing the nut with an annular groove in the clamping face thereof and an axially projecting washer retaining skirt by simple and economical swaging or extruding steps. While the preferred embodiments of the present invention have been shown and described herein, it is obvious that many details may be changed without departing from the spirit and scope of the appended claims.

The invention is claimed as follows:

1. A method of making a rotary fastener such as a nut comprising providing an imperforate blank having an outer side and an opposite radially extending clamping face with an annular groove in said clamping face to form an inner centrally located skirt with a terminal free end at a predetermind position with respect to said clamping face, partially punching a central aperture in said outer side and simultaneously deforming material from said partially formed aperture into surrounding portions of the blank and relatively axially shifting the terminal free end of the skirt axially outwardly from said clamping face, and subsequently completely punching a central aperture in said blank.

2. A method of making a rotary fastener such as a nut from an imperforate blank having a radially extending clamping face comprising partially punching a central aperture in said clamping face, embossing said clamping face to provide an annular skirt surrounding said partially formed aperture with a terminal free end of said skirt at a predetermined position with respect to said clamping face, partially punching a central aperture in a face of said blank opposite from said clamping face and simultaneously deforming material from said last mentioned partially formed aperture into surrounding portions of the blank and relatively axially shifting the terminal free end of the skirt axially outwardly from said clamping face, and subsequently completely punching a central aperture in said blank.

3. A method of making a pre-assembled rotary fastener unit including a nut and a washer comprising partially punching a central aperture in an outer side of an imperforate nut blank having an opposite clamping face and a centrally located annular skirt initially terminating substantially in the plane of said face, simultaneously deforming material from the partially formed aperture into surrounding portions of the blank and shifting the free terminal end of said skirt axially outwardly from said clamping face, subsequently completely punching a central aperture in said blank, assembling a washer over said skirt, and flaring the skirt outwardly to retain the washer.

4. A method of making a pre-assembled rotary fastener unit including a nut and a washer comprising providing a nut blank having a radially extending clamping face and an opposite outer side, embossing said clamping face to provide an annular centrally located skirt with a terminal free end at a predetermined position with respect to said clamping face, partially punching a central aperture in said outer side and simultaneously extruding material from said partially formed aperture axially and into surrounding portions of said blank and shifting the terminal free end of said skirt axially outwardly from said clamping face, subsequently completely punching a central aperture in said blank, assembling a washer over said skirt, and flaring the skirt outwardly to retain the washer.

5. A method of making a rotary fastener such as a nut from a length of bar stock comprising severing a blank having an axial thickness greater than a predetermined thickness of a finished nut to be formed from the bar stock, swaging the blank and simultaneously bevelling opposite ends thereof, then swaging and flattening the blank, then partially punching a central aperture in a clamping end of the blank and embossing said clamping end to provide an annular skirt surrounding said partially formed aperture with a terminal free end of the skirt at a predetermined position with respect to said clamping end, then partially punching a central aperture in an end of the blank opposite from said clamping end and simultaneously deforming material from said last mentioned partially formed aperture into surrounding portions of the blank and relatively axially shifting the terminal free end of the skirt axially outwardly from said clamping end, and subsequently completely punching the central aperture in the blank.

6. A method of making a rotary fastener such as a nut from an imperforate blank having a clamping end, comprising partially forming a central aperture in said clamping end of the blank, forming an annular skirt on the blank surrounding said partially formed central aperture and radially spaced inwardly from a peripheral margin of the blank and having a predetermined initial axial length and a free terminal end at a predetermined position with respect to the clamping end of the blank, and then extruding the material from a portion of the blank adjacent said skirt into the skirt and increasing the axial length of said skirt.

References Cited in the file of this patent
UNITED STATES PATENTS

| | | |
|---|---|---|
| 1,832,167 | Wilcox | Nov. 17, 1931 |
| 1,925,753 | Fitch | Sept. 5, 1933 |
| 2,016,296 | Rosborough | Oct. 8, 1935 |
| 2,043,101 | Jesser | June 2, 1936 |
| 2,054,187 | Almdale | Sept. 15, 1936 |
| 2,576,906 | Poupitch | Nov. 27, 1951 |
| 2,689,360 | Ware | Sept. 21, 1954 |
| 2,756,444 | Schaeffer | July 31, 1956 |